(No Model.) 8 Sheets—Sheet 1.

G. W. PRESCOTT.
BURNER FOR LIQUID HYDROCARBONS.

No. 606,238. Patented June 28, 1898.

Witnesses:
Chas. E. Gaylord
Lute J. Peters

Inventor:
George W. Prescott,
By Banning & Banning & Sheridan,
Attys (No Model.)  8 Sheets—Sheet 2.

G. W. PRESCOTT.
BURNER FOR LIQUID HYDROCARBONS.

No. 606,238. Patented June 28, 1898.

Witnesses:

Inventor:
George W. Prescott,

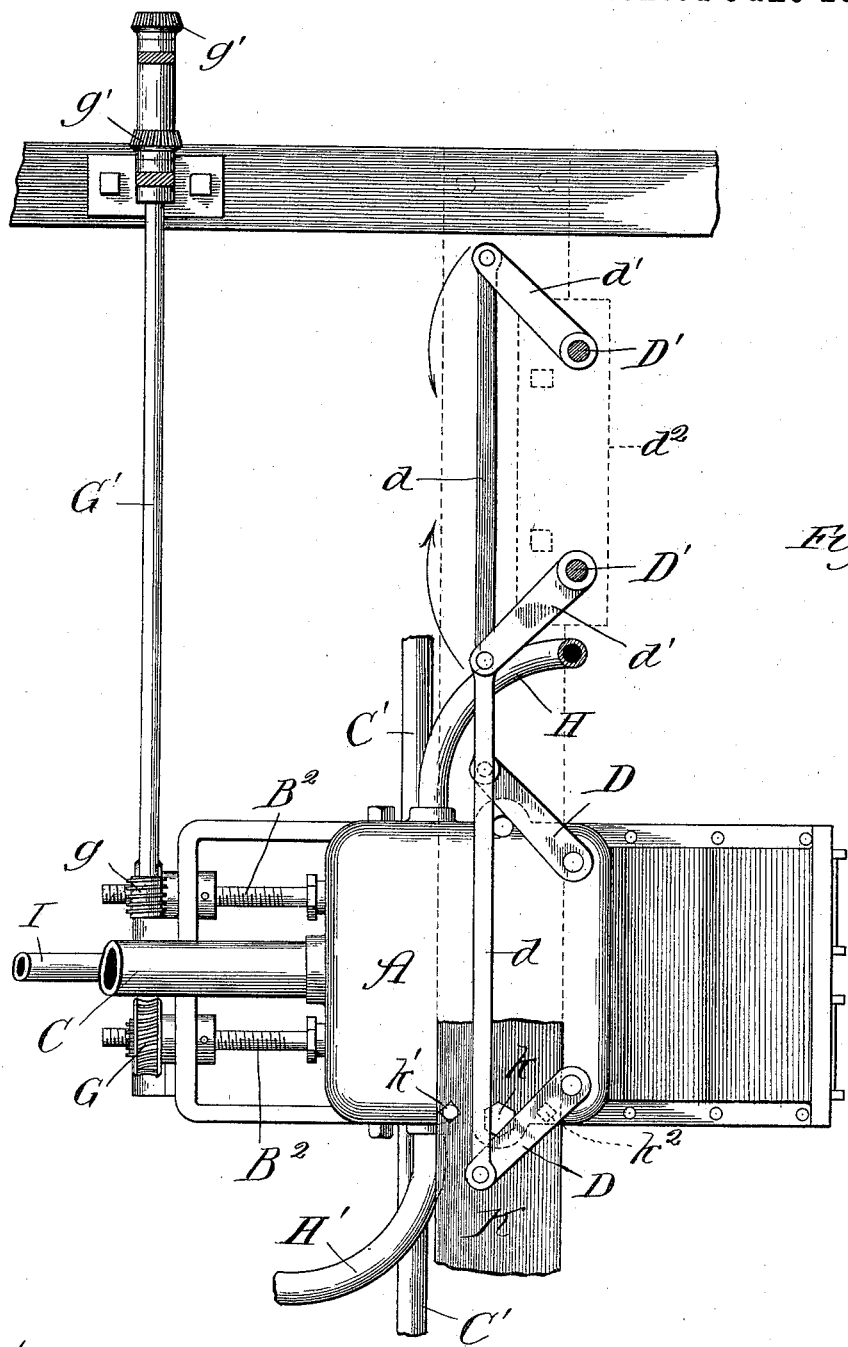

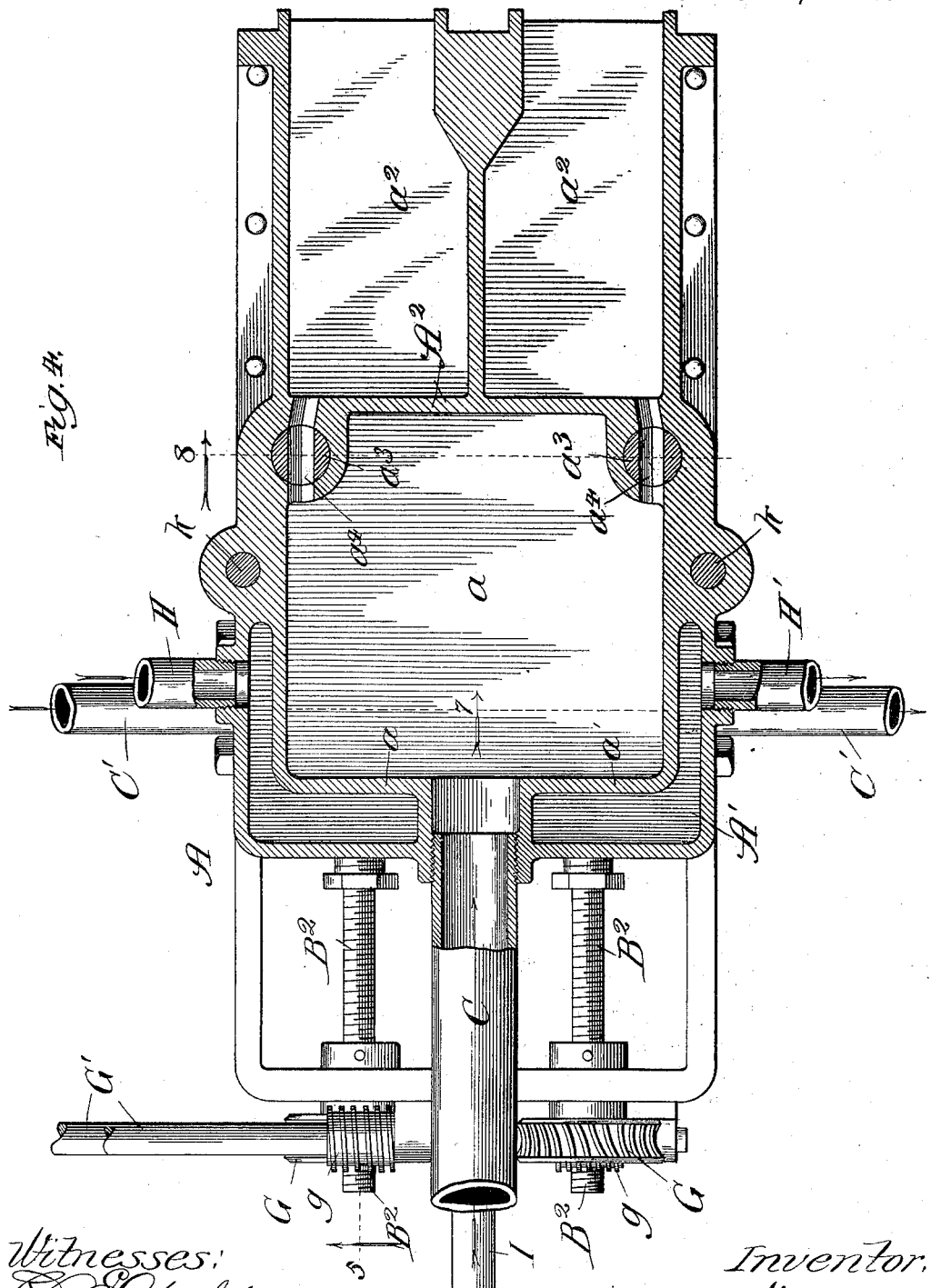

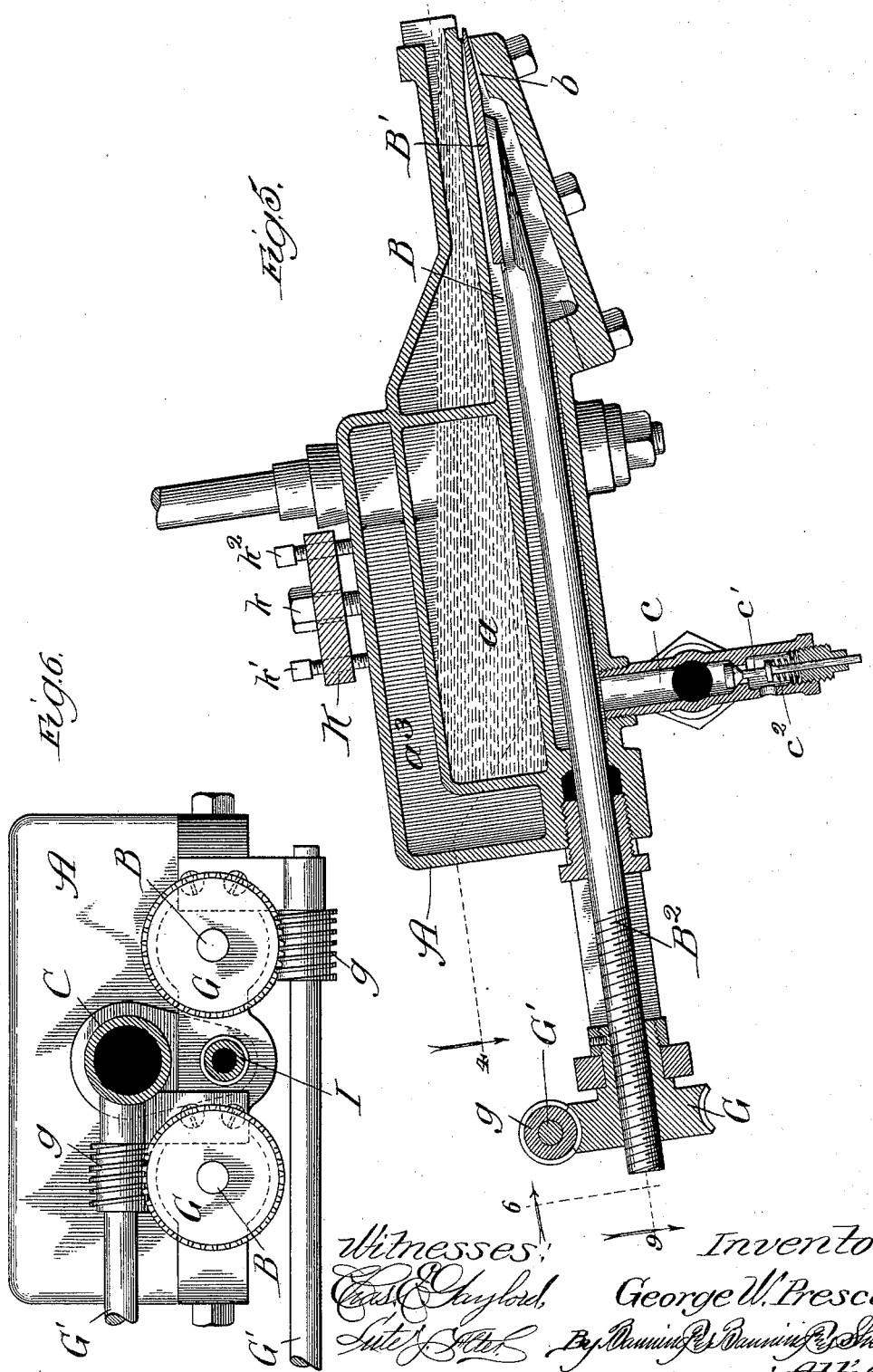

(No Model.)  8 Sheets—Sheet 6.
G. W. PRESCOTT.
BURNER FOR LIQUID HYDROCARBONS.
No. 606,238. Patented June 28, 1898.
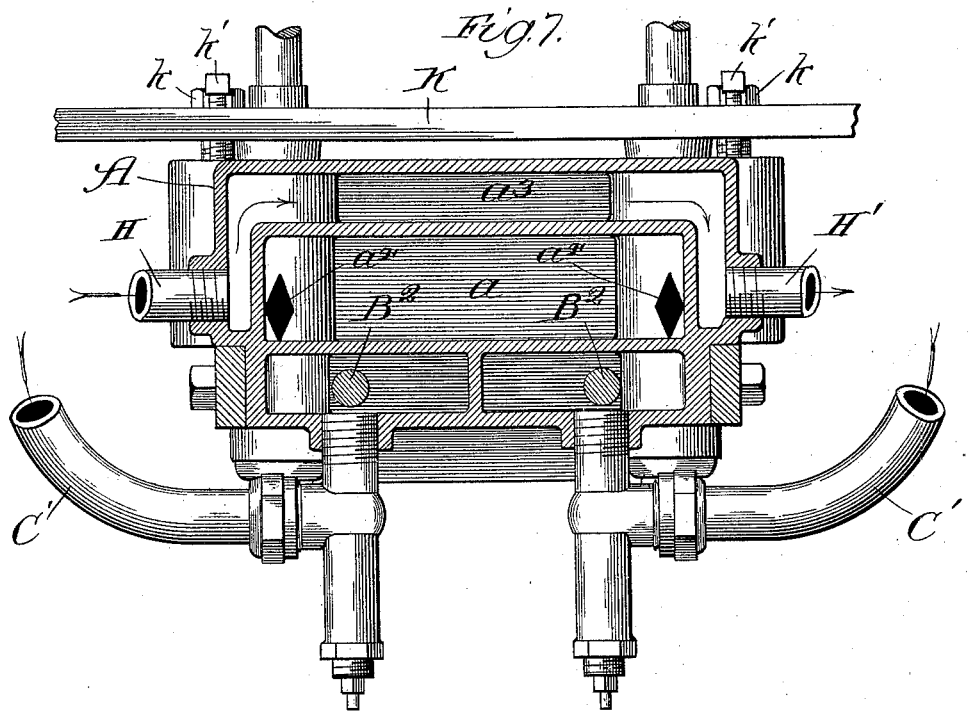
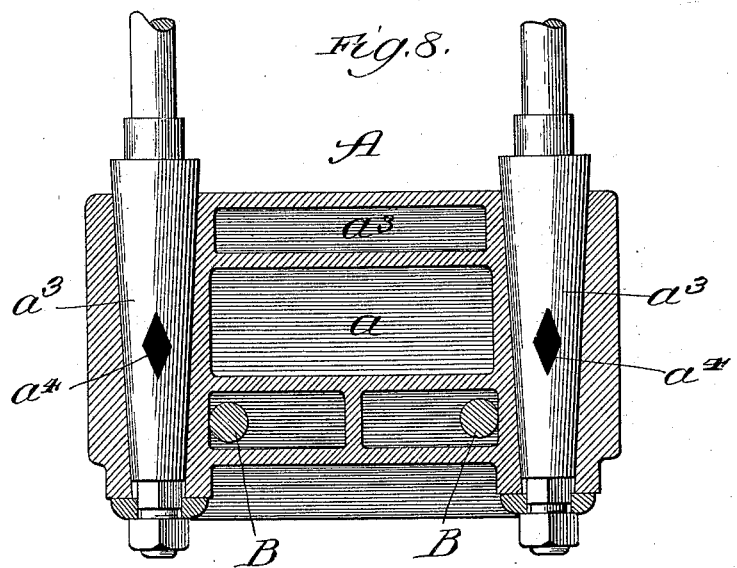
Witnesses:
Inventor:
George W. Prescott,
By Banning & Banning & Sheridan,
Att'ys (No Model.) 8 Sheets—Sheet 7.

G. W. PRESCOTT.
BURNER FOR LIQUID HYDROCARBONS.

No. 606,238. Patented June 28, 1898.

Witnesses:

Inventor:
George W. Prescott,
By Banning & Banning & Sheridan,
Atty's (No Model.) 8 Sheets—Sheet 8.

G. W. PRESCOTT.
BURNER FOR LIQUID HYDROCARBONS.

No. 606,238. Patented June 28, 1898.

Witnesses:

Inventor:
George W. Prescott

UNITED STATES PATENT OFFICE.

GEORGE W. PRESCOTT, OF HIGHLAND, CALIFORNIA.

BURNER FOR LIQUID HYDROCARBONS.

SPECIFICATION forming part of Letters Patent No. 606,238, dated June 28, 1898.

Application filed December 14, 1896. Serial No. 615,576. (No model.)

*To all whom it may concern:*

Be it known that I, GEORGE W. PRESCOTT, a citizen of the United States, residing at Highland, in the county of San Bernardino, in the State of California, have invented certain new and useful Improvements in Burners for Liquid Hydrocarbons, of which the following is a specification.

My invention relates particularly to that class of burners that are adapted for the burning of liquid hydrocarbons, and especially to that class that is used in connection with a pressure of steam for the purpose of atomizing the oil as it leaves the burner.

The object of my invention is to provide a simple, economical, and efficient burner for the use of liquid hydrocarbons; and the invention consists in the features, combinations, and details of construction hereinafter described and claimed.

Figure 1:
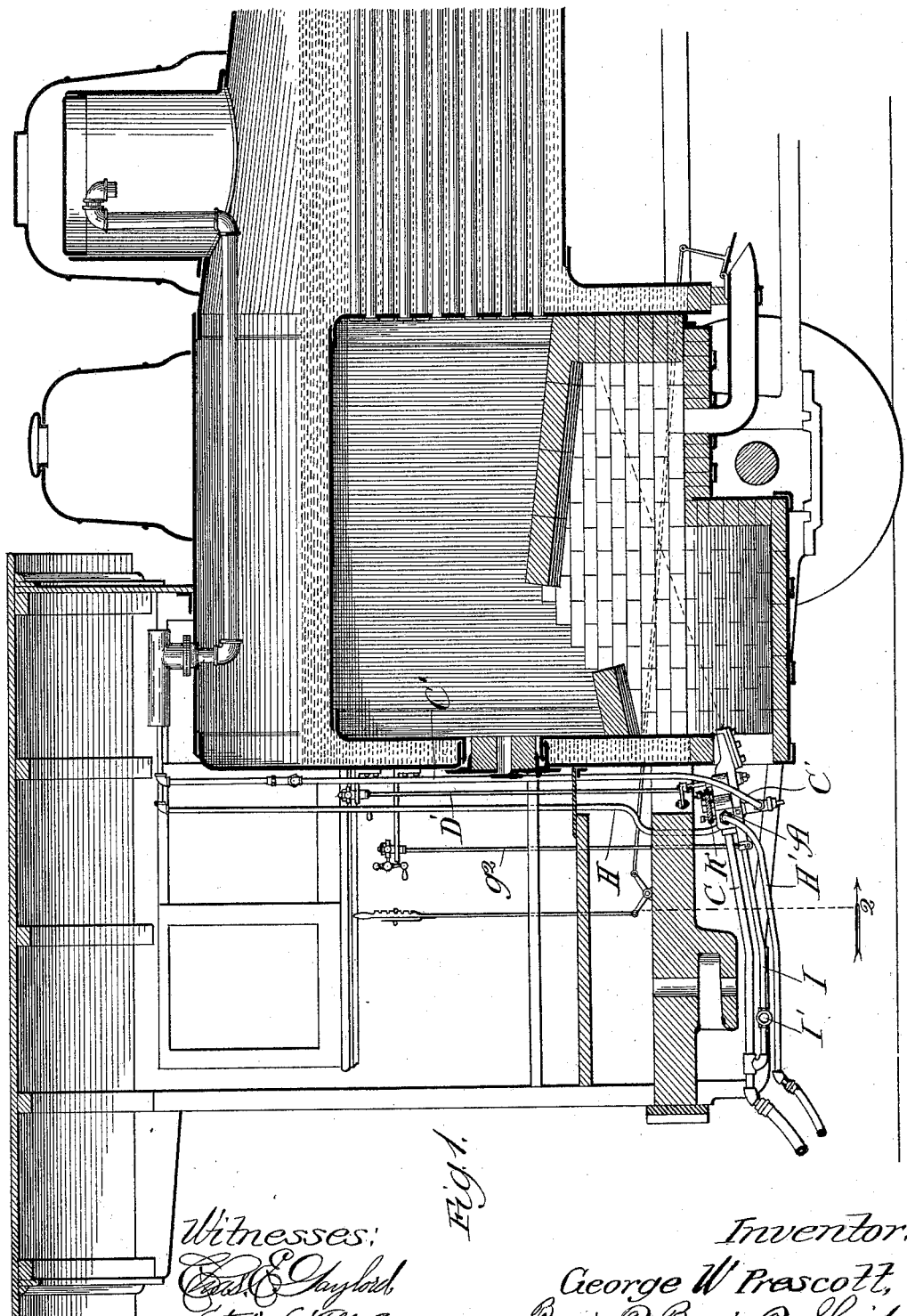
Figure 2:
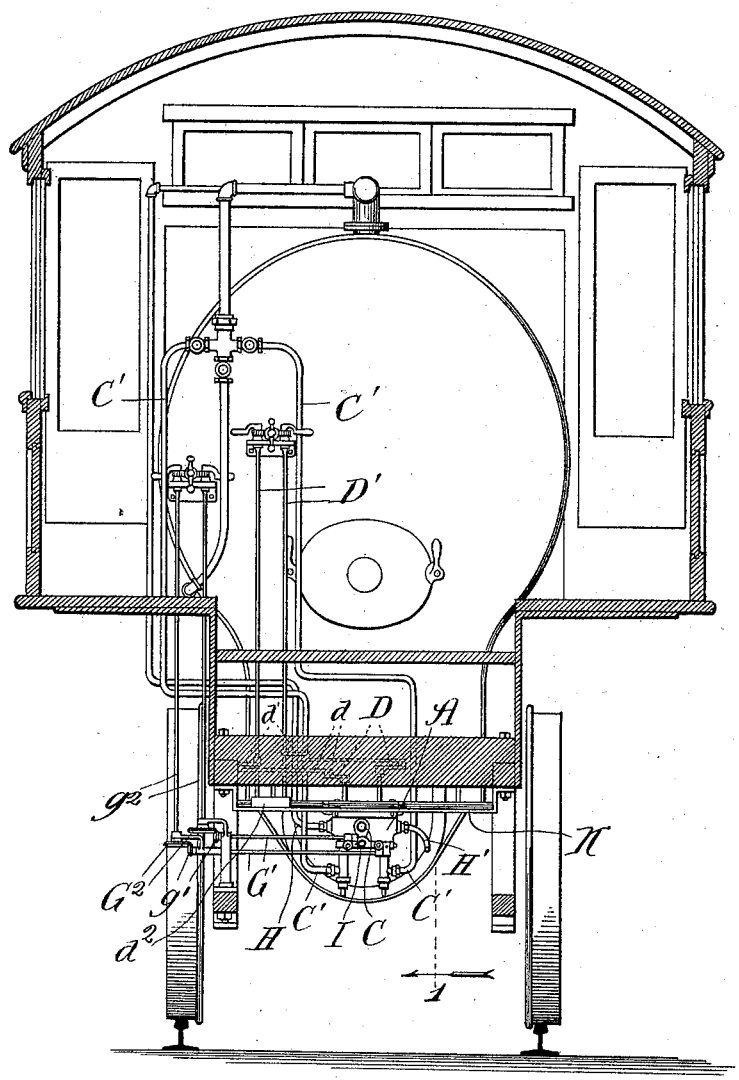
Figure 9:
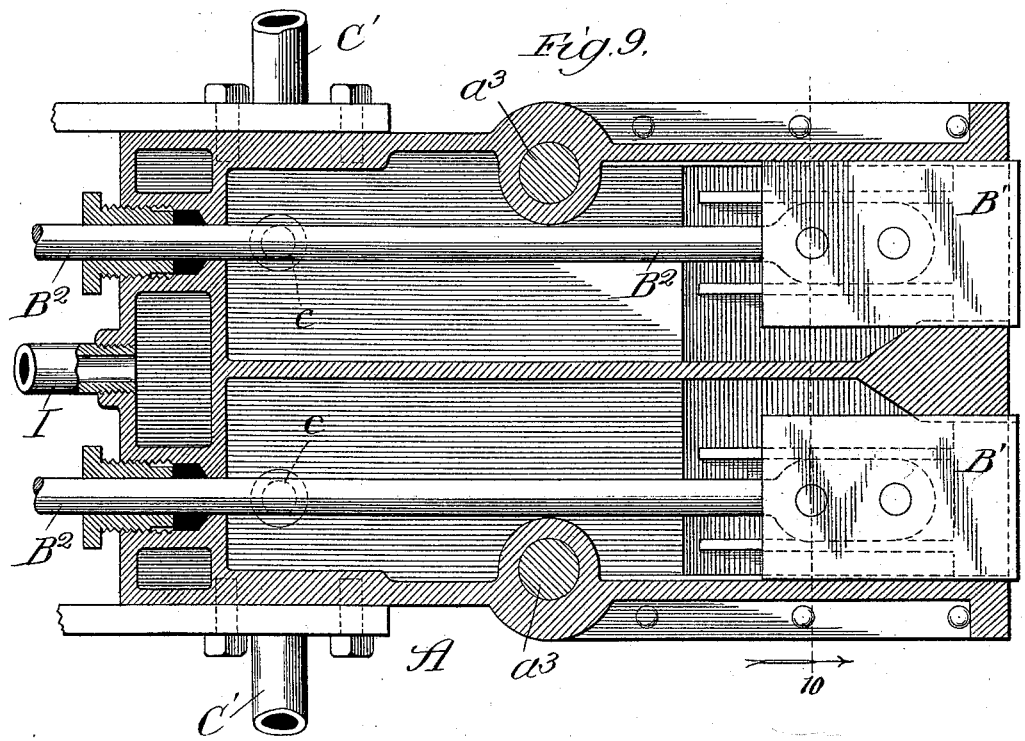
Figure 10:
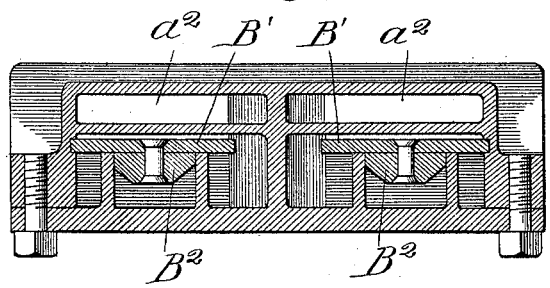
Figure 11:
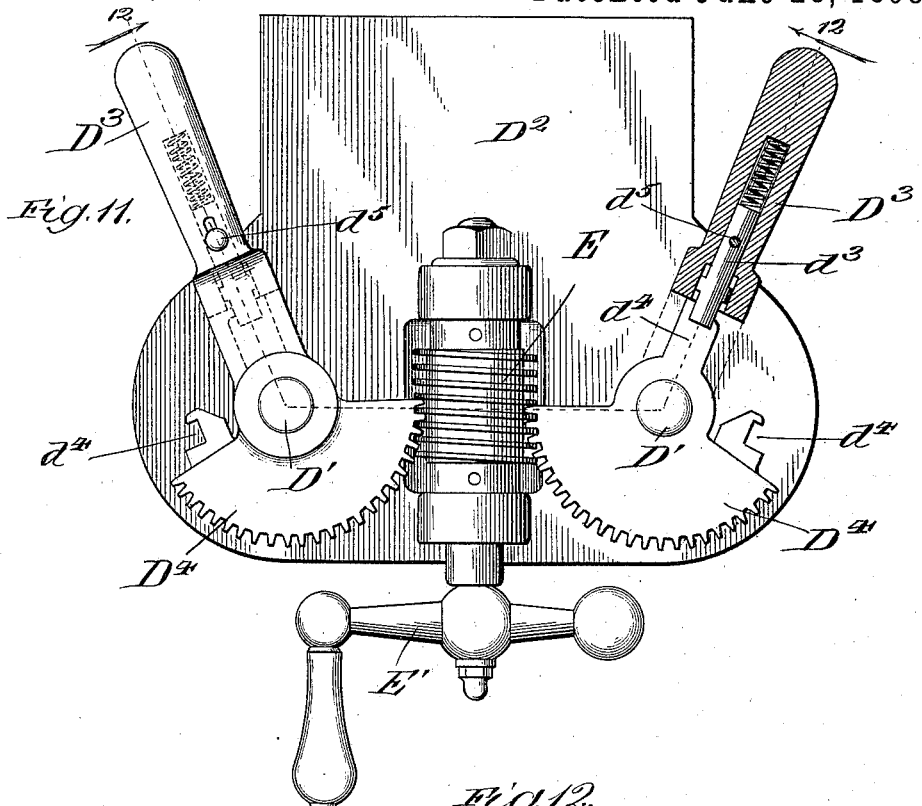
Figure 12:
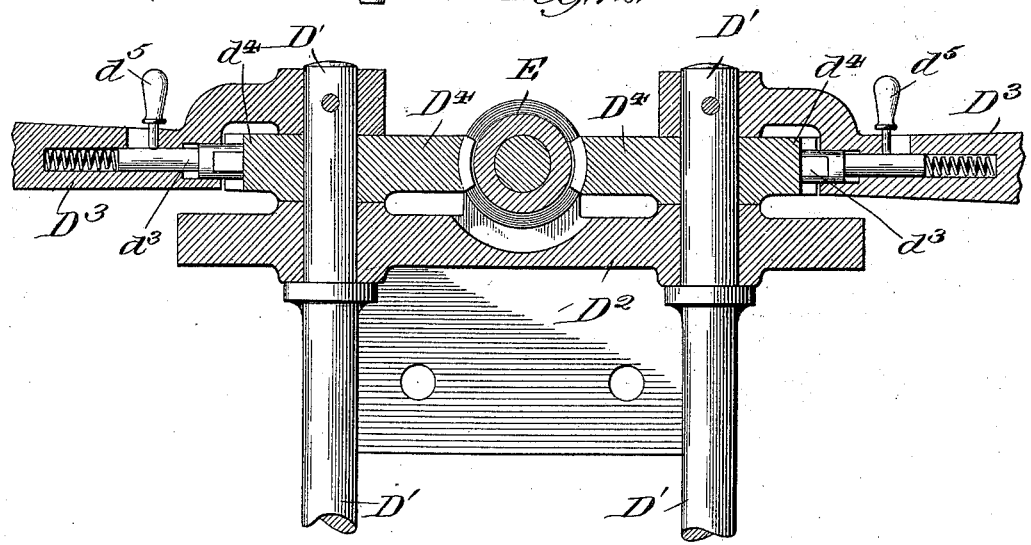

In the accompanying drawings, Figure 1 is a vertical central sectional elevation of a locomotive and cab fitted with my burner and taken about on line 1 of Fig. 2. Fig. 2 is a transverse sectional elevation taken on the line 2 of Fig. 1. Fig. 3 is a plan view of the burner removed from the locomotive, looking at it from the top. Fig. 4 is a plan sectional view of the burner, taken on line 4 of Fig. 5; Fig. 5, a vertical sectional elevation of the burner, taken on the line 5 of Fig. 4; Fig. 6, an end elevation of the burner, taken on the line 6 of Fig. 5 and looked at in the direction of the arrow. Figs. 7 and 8 are transverse sectional views taken on lines 7 and 8, respectively, of Fig. 4. Fig. 9 is a plan sectional view of the burner, taken on the line 9 of Fig. 5; Fig. 10, a transverse sectional view taken on the line 10 of Fig. 9; Fig. 11, a plan view of the valve-closing mechanism; and Fig. 12, a sectional elevation of the same, taken on the irregular line 12 12 of Fig. 11.

In illustrating and describing my improvement I will illustrate and describe it in connection with an oil-burning locomotive, so as to show one of the many uses to which this burner is applicable. I do not, however, intend to limit myself to this particular use, as it will be readily understood that my improvements are capable of being utilized in connection with many kinds of furnaces by the exercise of mere mechanical skill, such as the ordinary mechanic is capable of exercising to make the changes to suit different circumstances and conditions.

For convenience I have shown my improvements in the form of a multiple burner, or, in other words, a double burner, though the burner may be used in a single form or in multiple relation in which several burners are combined and operated.

In constructing a burner in accordance with my improvements I make a casing A of the desired form and size and provide it with a central oil-receiving chamber $a$, Figs. 4 and 5. This chamber has walls $a'$, that are located inside of the exterior walls of the casing, so as to form an encompassing chamber or channel $A'$, in which water or steam under pressure may be used for the purpose of raising the temperature of the oil or lowering the same to suit varying circumstances and conditions. I prefer to make the casing of my burner rectangular in shape and provide it with any number of exit-passages $a^2$, into which the oil is fed from the oil-chamber before passing into the combustion-chamber. These exit-passages are irregular in shape or larger at their induct portions than at the outlets, so as to contract the supply of oil at the outlet, so that when the burner is tilted at an angle, as indicated in Fig. 5, the upper level of the oil will be above the upper surface of the contact-opening and form a trap, as it were, to prevent gas or heated products from flowing back into the oil-chamber to cause an explosion therein.

The casing of the burner at its lower portion is provided with steam-chambers B, having tapered slotted openings $b$, in which are movably mounted tapered slide-valves $B'$. The exit-openings of these chambers, in which these "atomizing-valves," as I term them, are arranged, are located immediately under the exit-openings of the liquid hydrocarbons, and the steam-chamber is connected with the source of steam under pressure, hereinafter described, so that when the valves are opened steam under pressure contacts with the liquid hydrocarbon immediately, atomizes the same, and drives it into the fuel-chamber with sufficient force to meet the incoming atmospheric air and promote combustion.

The steam-supply chamber in which the valves are located is connected by means of a pipe C' with a source of steam-supply, so that steam under pressure may be furnished the casing to atomize the oil, as above indicated. I prefer to connect this steam-supply pipe with the tubular projection $c$, in which is located a drip-valve $c^2$, the parts being so arranged that when steam under sufficient pressure is furnished to the chamber the drip-valve is kept closed; but as soon as the pressure is lowered sufficiently the valve is opened by means of the tension-spring and the water of condensation allowed to drip out and empty the chamber and pipe. This can be done without disturbing the atomizing-valve B'. From the arrangement of parts it will be seen that when the atomizing-valve B' is closed there is a supply of steam under pressure surrounding the oil at the lower portion thereof that is brought into use the moment the valve is opened, and the objection of having water of condensation in the steam-chamber of the burner, which would prevent steam from passing through said valve in its first opening, is obviated.

To supply the burner with its requisite amount of liquid hydrocarbon, I provide it with a supply-pipe C, which passes back, as shown in Fig. 1, to be connected with a suitable oil-reservoir (not shown) located, preferably, in the tender. This supply-pipe may be provided with any kind of a valve (not shown) for regulating the admission of oil to the chamber of the burner.

In Fig. 4 of the drawings I show a partition or dividing-wall $A^2$ as separating the oil-chamber from the exit chambers or passages. In this wall I provide several plug-valves $a^3$, having transverse passages $a^4$ arranged therein. Where a single burner only is used, there is but one valve, but where multiple burners are used there will be a valve for every burner or every exit-passage. It will be noticed from an inspection of the drawings that these valves which govern the supply of liquid fuel are located in the burner at what might be termed a "point" adjacent to the burner-openings, intermediate such openings and the liquid-supply chamber $a$. The advantage of locating the governing-valve at this point is that the supply of oil can be cut off at once and at the same time hold the supply of oil near such point and ready for use when the valve is again opened. In order to operate these valves from the cab of the locomotive, as desired, I provide the upper part of the valve-stems with lever-arms D and each of the lever-arms with connecting-rods $d$, that connect them with similar levers $d'$, located on rotatable vertical rods D', that extend up into the cab of the locomotive, as shown in Fig. 2. These vertical rods have their lower bearing portions arranged in straps $d^2$ and their upper bearing portions in a bracket $D^2$, which is preferably secured to the boiler-head. In order to operate these vertical rods and thereby operate the valves in the oil-supply chamber of the burner, either independently or simultaneously, I provide the rods with handles $D^3$, (see Figs. 11 and 12,) that are rigidly secured thereto. These handles are provided with spring-latches $d^3$, arranged to engage the notches $d^4$, located on the bracket. Mounted loosely upon the vertical rods are segmental gears $D^4$, which have portions $d^4$ extending out from the same and adapted to engage with the latches on the operating-handles and make both of such mechanisms to all intents and purpose one integral portion.

In the drawings, as hereinbefore stated, I show a double burner or a burner having two exit-openings. Consequently I provide for operating one or both of these burners by means of two vertical operating-rods. In order to operate these rods simultaneously or independently, as desired, I rotatably mount a worm E between the two segmental gears, so that the helical part of the worm will enter the spaces formed by the teeth on the segmental racks and operate both of such racks, as shown in Fig. 11. When it is desired to operate both of the handles at one time or simultaneously, the handles and segmental racks are brought into engagement, as shown in Fig. 11, and the worm rotated by means of the handle E'. This action rotates the handles, one to the right and one to the left, so as to vibrate the lever mechanism shown in Fig. 3, and tend to close the valves that supply the oil to the exit-passages of the burner. When it is desired to operate either valve independently or close one and leave the other open, the pin or stud $d^5$, that projects out from one handle, is pushed back to release the latch mechanism, so that such handle may be quickly and independently operated. It will thus be seen that the other handle can then be slowly and independently operated by means of the worm and gear and different-sized openings of its oil-valve be maintained or such openings be closed without in any way affecting the other handle and its valve. The advantage resulting from the use of a structure constructed as above described will be appreciated by those skilled in the art when it is known that at different temperatures different quantities of oil are needed to produce the heat necessary as well as for different-sized loads and varying conditions.

To operate the steam-atomizing valves in the burner, I provide each valve with a stem $B^2$, that projects out of the rear end of the casing, and which rear portion is provided with screw-threads engaging with the threads in axial openings of worm-gears G. Each one of these atomizing-valves, as shown in Figs. 3 and 4, is provided with the worm-gear above noted, and each worm-gear has an independent operating-shaft G', provided with a worm $g$, engaging the worm-gears. These shafts are led to any desired position, and, as shown in Fig. 2, to one side of the locomotive, the outer end portions being provided with beveled pinions $g'$, engaging the beveled gears $G^2$, arranged on a second set of rotating vertical shafts $g^2$, the upper ends of which are arranged inside of the locomotive-cab, as shown in Fig. 2. The upper ends of these shafts are provided with mechanism for operating the same in all respects similar to mechanism described in connection with the oil valves and burner, and, as shown particularly in Figs. 11 and 12, so that each one of these valves may be operated independently or simultaneously, as desired.

In order to furnish steam under pressure to the encompassing chamber A', that surrounds the oil-chamber or water to the same, so as to maintain the oil in the burner at the desired temperature, I connect the chamber by means of a pipe H to the source of steam-supply and by means of a pipe H' to the water tank or reservoir located, preferably, in the tender, which holds a supply of cool water, each of said pipes having valve mechanisms so arranged that steam under pressure may be furnished the burner-chamber or to shut off the steam and supply water to surround the same. Further, it will be noticed that the slides of the atomizing-valves are mounted in guides, so that their movement is positive, and that the amount of the opening is thereby always positively regulated by the movement of the sliding portion of the valve, as shown particularly in Figs. 5, 9, and 10.

In order to clean out the oil-chamber, valves, and exit-passages thereof at desired times, I provide a branch pipe I, that is connected with the steam encompassing chamber and oil-supply pipe, as shown in Fig. 9, so that when desired the oil-supply is shut off, the valve I' opened, which acts to force the steam from the source of steam-supply around and through the encompassing or what might be termed the "insulating" chamber, through the pipe I and pipe C into and through the oil-supply, and thereby clean the oil-supply of any sediment or dirt contained therein. When desired to clean the oil-supply pipe, the oil-valves in the burner are closed, the valve I' on the branch pipe opened, and the valve in the oil-supply pipe opened, and the steam forced back through such pipe into the oil-reservoir, thereby cleaning the oil-supply pipe of any sediment or dirt located therein.

As shown in Fig. 1, the burner is arranged at a slight inclination from a horizontal line, so as to provide, as hereinbefore stated, a trap and prevent backflow of gas from entering, igniting, and exploding in the oil-reservoir. The inclination of the burner is accomplished by securing the burner (shown particularly in Fig. 5) to a cross supporting-strap K by means of three screws—a main screw $k$ and two set-screws $k'$ and $k^2$. By adjusting the relation of these screws the burner may be tipped and held at any desired angle to meet different circumstances and conditions.

While I have described my invention with more or less minuteness as regards details as being embodied in certain precise forms and adapted for certain specific uses, I do not desire to be limited thereto unduly or any more than is pointed out in the claims. On the contrary, I contemplate all proper uses, changes in form, construction, and arrangement, the omission of immaterial elements, and the substitution of equivalents, as circumstances may suggest or necessity render expedient.

I claim—

1. An oil-burner provided with an oil-supply passage, a valve in such passage adjacent to the exit-opening to regulate the outflow of the oil, a steam or fluid pressure chamber underneath the oil-supply passage having its exit-opening underneath and substantially in line with the exit-opening for the oil and provided with a movable valve to regulate the amount of steam under pressure escaping from its exit-passage, substantially as described.

2. An oil-burner provided with an oil-supply passage, a rotatable valve in such passage adjacent to the exit-opening to regulate the supply of oil passing through the passage, a steam or fluid pressure chamber arranged under the oil-passage and with its exit-opening directly under and substantially in line with the oil-exit, a steam-supply valve arranged in the exit-opening of the steam-chamber to regulate the amount of steam under pressure issuing from said chamber to atomize the oil, substantially as described.

3. An oil-burner provided with an oil-supply chamber and an exit-opening, a rotatable valve in the burner adjacent to and intermediate the exit-opening and supply-chamber for regulating the flow of oil to the exit-opening, a fluid-pressure chamber located under the oil-supply chamber and with its exit-opening arranged under the exit-opening for the oils, and a slide-valve arranged in such opening to regulate the size of the opening and thereby the amount of steam under pressure escaping therefrom to atomize the oil, substantially as described.

4. An oil-burner provided with a central interior oil-supply chamber and an exit-passage leading from such chamber and an encompassing or inclosing chamber around the oil-supply chamber and adapted to be connected with a source of steam under pressure on one side and cool-water supply on the other side to keep the oil in the burner at substantially uniform temperature, and with steam-supply chamber connected with a source of steam-supply and having its exit-openings arranged underneath the exit-opening of the oil-chamber, a rotatable valve located between the oil-supply chamber and the exit-passage to govern the supply of oil entering the exit-passage and a slide-tapered valve arranged in the exit-opening of the steam-chamber to regulate the size of said opening, the amount of steam under pressure issuing therefrom and the atomizing of the oil, substantially as described.

5. An oil-burner provided with a central interior oil-supply chamber and an exit-passage leading from such chamber and an encompassing or inclosing steam-chamber around the oil-supply chamber and adapted to be connected with a source of steam under pressure on one side and cool-water supply on the other side, and with an independent steam-supply chamber connected with source of steam-supply and having its exit-opening arranged underneath the exit-opening of the oil-chamber, a rotatable valve located between the oil-supply chamber and the exit-passage to govern the supply of oil entering the exit-passage, a slide tapered valve arranged in the exit-opening of the independent steam-pressure chamber to regulate the size of said opening, the amount of steam under pressure issuing therefrom and the atomizing of the oil, and a pressure drip-valve located in the lower portion of the independent pressure-chamber to automatically operate and allow the water to drip therefrom when the pressure in such chamber falls below a predetermined point, substantially as described.

6. An oil-burner provided with an oil-supply chamber and an exit-passage, a rotatable valve in the burner intermediate the supply-chamber and its exit-opening to govern the supply of oil, a steam or fluid pressure passage arranged underneath and with its exit-opening adjacent to that of the oil-supply passage, a valve in the steam-pressure exit-opening to govern the supply of steam under pressure, and means for adjustably supporting the burner so as to tilt it at the desired angle and form an oil-trap, substantially as described.

7. An oil-burner provided with a substantially rectangular oil-supply chamber and an irregular-shaped exit-passage, a partition dividing such chamber and passage, a valve in such partition to regulate the outflow of the steam, and means for tilting the burner out of a horizontal plane to form an oil-trap in the burner, substantially as described.

8. A multiple liquid-hydrocarbon burner provided with one oil-chamber and at least two independent exit-passages, a rotatable valve for each of such passages whereby the outflow of oil to the passages is regulated, a rotatable operating-rod shaft $D'$ for each of such valves, a handle portion rigidly secured to each of such rotatable rods, gear mechanism independently and rotatably mounted upon each of said rods, mechanism for connecting and disconnecting the handle portions with the gears as desired and means for operating the gears, the whole so arranged that the valves may be operated independently or simultaneously, substantially as described.

9. A multiple liquid-hydrocarbon burner provided with one oil-chamber and at least two independent exit-passages, a rotatable valve for each of such passages whereby the supply of oil to the passages is regulated, a rotatable operating-rod shaft $D'$ for each of such valves a handle portion rigidly secured to each of such rotatable rods, gear mechanism independently and rotatably mounted upon each of said rods, mechanism for connecting and disconnecting the handle portions with the gears as desired and means for operating the gears so that the valves may be operated independently or simultaneously, and lever mechanism connecting the rods $D'$ with the stems of the rotatable valves for transmitting power and motion thereto, substantially as described.

10. An oil-burner provided with an oil-supply passage having an exit-passage and with a steam-supply chamber surrounding a portion of the oil-chamber, a supply-pipe leading to the oil-supply passage a steam-supply pipe leading to the chamber surrounding the oil-passage, a branch pipe leading from the steam-chamber to the oil-supply pipe and provided with a valve thereon so that when desired the oil passage or supply pipe may be cleaned by steam under pressure, substantially as described.

GEORGE W. PRESCOTT.

Witnesses:
THOMAS B. MCGREGOR,
THOMAS F. SHERIDAN.